July 28, 1953 — J. P. TEMPLEMAN — 2,646,695
RAILWAY CAR HAND BRAKE
Filed Sept. 16, 1950 — 3 Sheets-Sheet 1
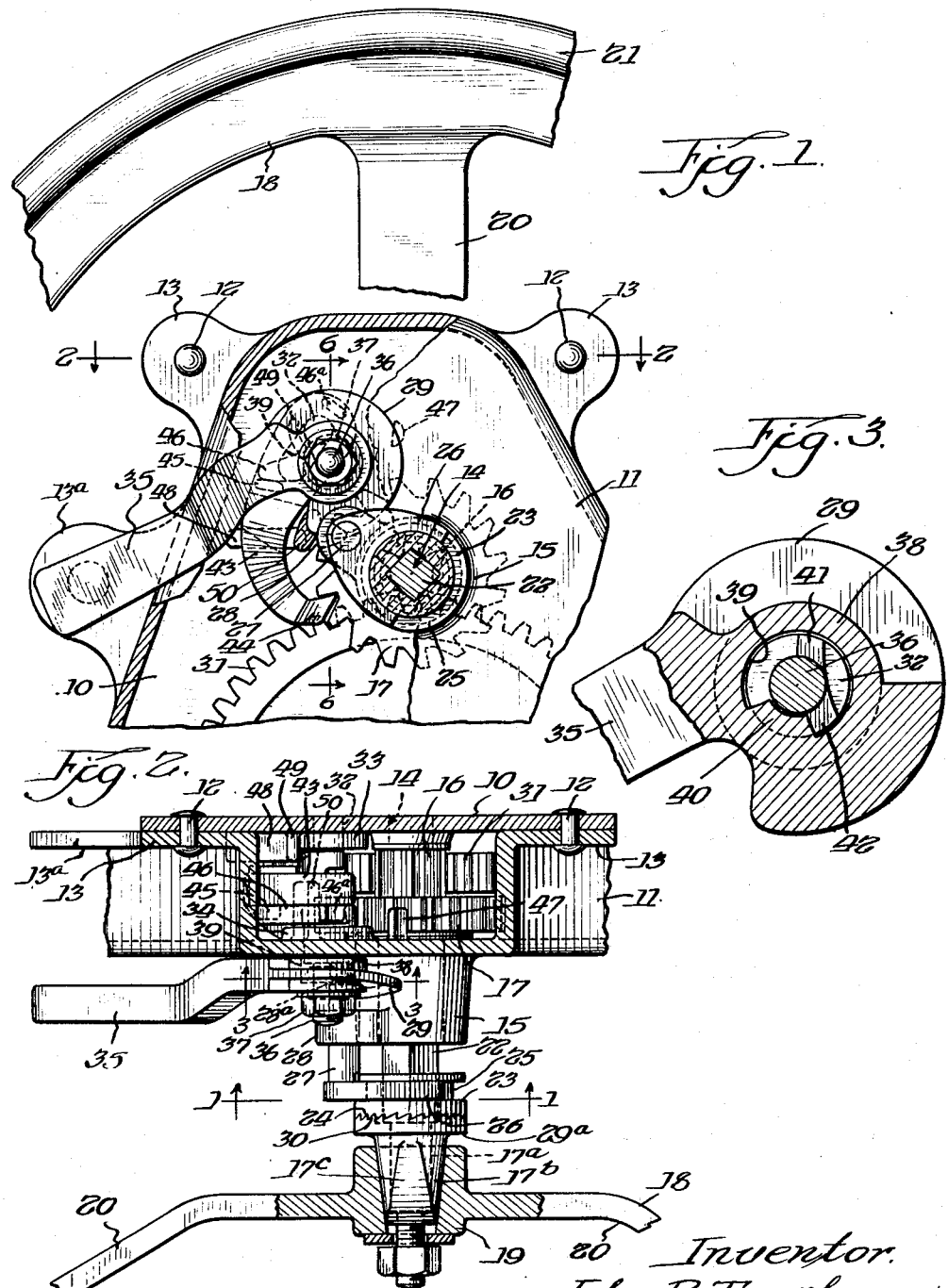
Inventor.
John P. Templeman.

July 28, 1953  J. P. TEMPLEMAN  2,646,695
RAILWAY CAR HAND BRAKE
Filed Sept. 16, 1950  3 Sheets-Sheet 2
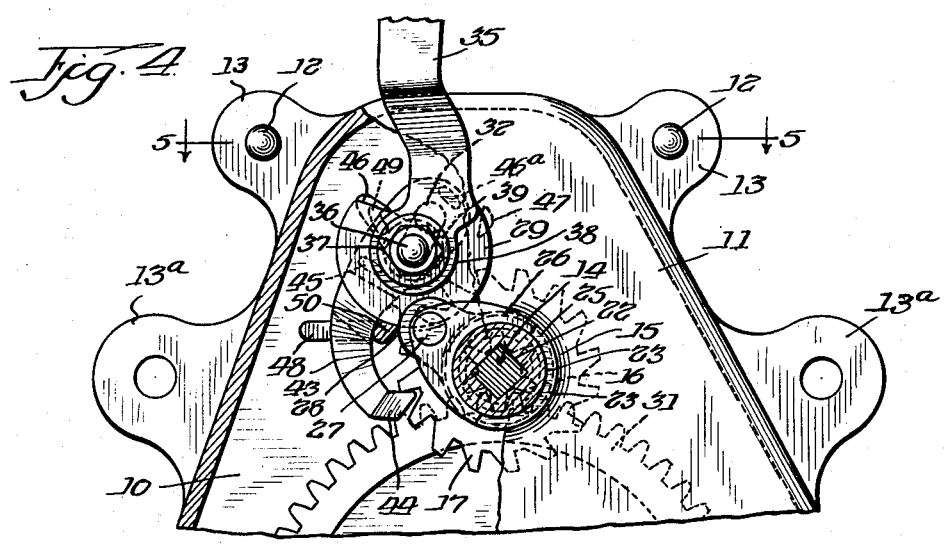
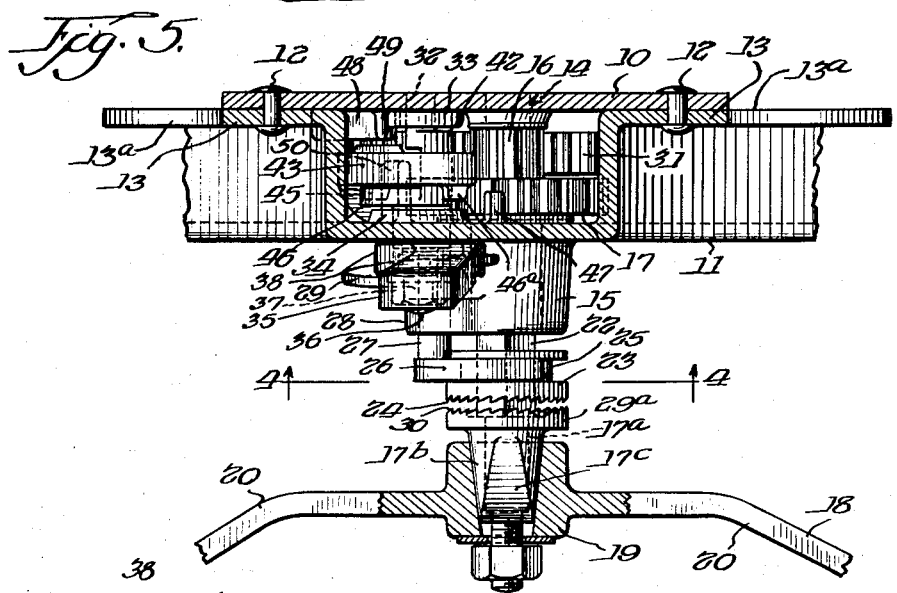
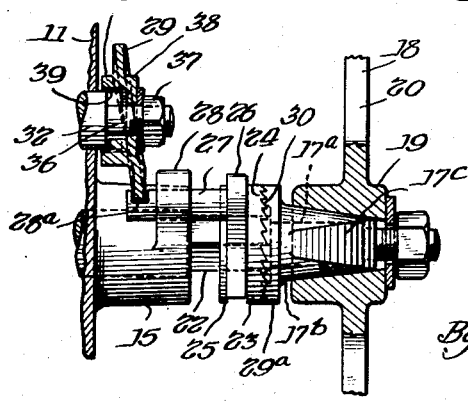
Inventor.
John P. Templeman.
By Wilkinson, Huxley, Byron & Hume
Attys.

July 28, 1953  F. H. MUELLER ET AL  2,646,699
DRILLING MACHINE
Filed Oct. 23, 1951  3 Sheets-Sheet 3
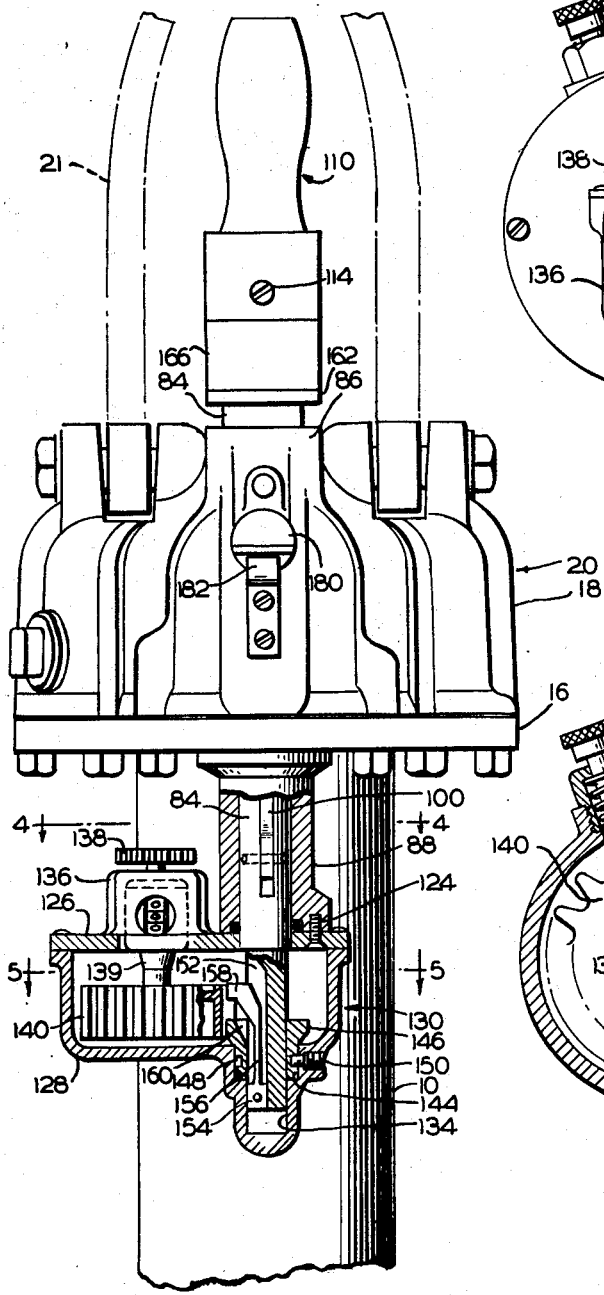
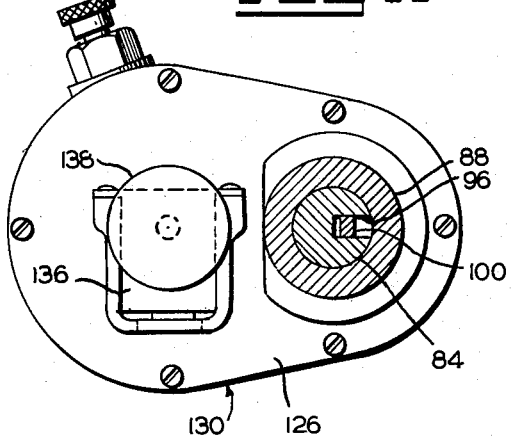
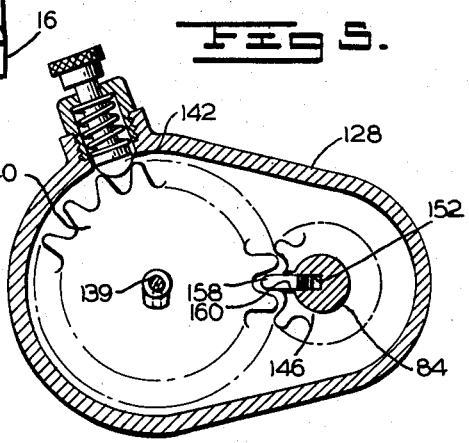
INVENTOR
FRANK H. MUELLER
JOHN J. SMITH
BY Cushman, Darby & Cushman
ATTORNEY Patented July 28, 1953

2,646,695

UNITED STATES PATENT OFFICE 2,646,695

RAILWAY CAR HAND BRAKE

John P. Templeman, Chicago, Ill., assignor to Superior Hand Brake Co., Chicago, Ill., a corporation of Illinois Application September 16, 1950, Serial No. 185,288

8 Claims. (Cl. 74—505)

My invention relates to railway car hand brakes and is adapted to be embodied into a hand brake such as is described in United States Patent No. 2,272,437, issued February 10, 1942, with the primary objective to be accomplished in my present structure of means for disconnecting the brake wheel from the winding mechanism in the released position of the brake.

Another and further object of my invention is the provision of means whereby the brake wheel is disconnected from the winding mechanism whereby when the brakes are released from the brake setting position, the hand wheel will not spin but will remain stationary, thereby avoiding the possibility that the switchman or operator of the brake can be thrown from the car by the rotation of the hand wheel, possibly resulting in serious injury to the switchman or operator.

Another and further object of my invention is the provision of a release mechanism for a hand brake operating wheel which is easy and simple in operation, which is effective and which will not slip during the brake setting position and which is so connected with the operating parts of the brake that when the brake is in released position, the brake wheel is loosely mounted and freely rotatable on the brake shaft, thereby making sure that back spin of the brake wheel is entirely eliminated and the danger resulting from the back spin usually developed in a brake wheel of this type when the brakes are released is removed.

Another and further object of my invention is the provision of a brake mechanism in which it is impossible to retain the brake wheel in operation with the winding mechanism of the chain when the pawl which holds the gear mechanism to prevent unwinding of the chain is in out of engagement position with the pawl wheel, thereby making it impossible for the operator to place the brake mechanism in released position without at the same time disconnecting the brake wheel so that the brake wheel is automatically placed in a non-spinning position. Therefore, through carelessness or forgetfulness, if these parts operated independently, the operator might operate one of them and not the other, which would result in difficulty. In this combination the brakes are so operated that the pawl must be in engaged position with the pawl wheel when the hand wheel is in engaged position with the brake mechanism and is held against backward rotation by the pawl and pawl wheel.

These and other objects of my invention will be more fully and better understood by reference to the accompanying drawings, and in which—

Figure 1 is a front view partially in elevation and partially in section of brake apparatus embodying my invention;

Figure 2 is a horizontal sectional view on lines 2—2 of Figure 1;

Figure 3 is a detail view of the base of the release handle partially in elevation and partially in section on lines 3—3 of Figure 2;

Figure 4 is a detail view showing the brake pawl mechanism in engaged position, a view quite similar to Figure 1 except that the release handle is moved toward the released position of the brakes;

Figure 5 is a horizontal sectional view taken on lines 5—5 of Figure 4, showing the brake wheel in fully released position from the winding mechanism;

Figure 6 is a detail sectional view taken on lines 6—6 of Figure 1 showing the brake wheel in engaged position;

Figure 7 is a view somewhat similar to Figures 1 and 2 showing the brake in fully released position taken on lines 7—7 of Figure 8; and, Figure 8 is a horizontal sectional view taken on lines 8—8 of Figure 7 with both the pawl and brake wheel in fully released position.

Referring now specifically to the drawings and in which like reference characters refer to like parts throughout, a back plate 10 is shown which is secured to a front housing 11 by means of rivets 12, 12 which pass through ears 13, 13 on the said front housing 11, which housing 11 covers the operating mechanism of the brake and is usually secured to the end of a railway car by means of bolts which pass through ears 13a, 13a on the front housing. A combined gear structure and brake wheel shaft 14 is provided which is mounted at its rear end in the back plate 10 and projects through a trunnion 15 formed on the front housing 11 and has a gear wheel 16 formed integrally therewith adjacent the inner end thereof, the hub of the gear wheel 16 being in a side to side engagement with a projection formed on the outer face of the plate 10. A pawl wheel 17 is formed adjacent the gear 16 and integrally with the said gear 16 and the shaft 14. The shaft 14 has a section 17a at its outer end which is round in cross section and has a ratchet thimble 17b mounted thereon having a round bore therein and freely rotatable on the round portion 17a of the brake wheel shaft 14. The ratchet thimble 17b has a plurality of flat faces 17c, 17c thereon which are inclined toward the outer end of the ratchet thimble 17b and has a brake wheel 18 mounted thereon, the brake wheel 18 having a hub portion 19 and the usual spokes 20, 20 with a rim 21 being provided which is normally grasped by the operator for rotating the hand wheel. The hub 19 of the brake wheel 18 has a square opening therein, the sides of which are inclined so as to be parallel with the flat faces 17c, 17c on the ratchet thimble 17b over which the hub 19 of the brake wheel 18 is fitted in tight non-rotatable relation with the thimble 17b. The brake wheel shaft 14 has a reduced portion at its extreme end which projects through the hub portion 19 with a threaded outer end upon which a nut is placed, thereby holding the brake wheel 18 securely on the ratchet thimble 17b.

The brake shaft 14 has a squared portion 22 intermediate the round portion 17a and the outer end of the trunnion 15 upon which is slidably mounted ratchet member 23 is positioned, this ratchet member having gear teeth 24 thereon on its outer side face and has a square opening therein which fits over the squared portion 22 of the brake shaft 14. A circumferential channel 25 is formed in the ratchet member 23 within which a shifting fork 26 is mounted with a shaft 27 being provided which is secured to the shifting fork 26 and extends through and is slidably mounted in an extension 28 integrally formed at the side of the trunnion 15 of the front housing 11. The shaft 27 has a transverse slot 28a formed adjacent its inner end for engagement with a rotatable cam 29, the operation of which will be more fully described hereinafter. The ratchet thimble 17b has an enlarged circular head portion 29a on the inner face of which gear teeth 30, 30 are formed to cooperate with the teeth 24, 24 on the outer face of the ratchet member 23 as the member 23 is slidably moved on the squared portion 22 of the brake shaft 14 into engaged and out of engaged position with the ratchet thimble 17b and forming a connection with the brake wheel by means of which the brake shaft 14 is rotated when the ratchet gear 23 on the squared portion 22 of the brake shaft is in engagement with the teeth 30 on the ratchet thimble 17a.

The gear 16 at the rear end of the shaft 14 is in engagement with a large gear 31 having a winding drum integrally formed therewith as shown and described in the patent hereinabove referred to and forming no part of the present invention, and about which a chain is wound for the application of the brake shoes to the wheels of the car with holding mechanism hereinafter described for engagement with the pawl wheel 17 which prevents the unwinding of the brake chain from the drum carried by the gear wheel 31.

The holding and releasing mechanism for the pawl wheel 17 comprises a crank shaft 32, one end of which is mounted in an opening through a projection 33 integrally formed with and extending outward from the back plate 10 and through an inward extending projection 34 integrally formed with the inner face of the housing 11, and a lever 35 mounted on the outer reduced end 36 of the crank shaft 32 by means of a nut 37, the said lever having a head portion 38 with which the cam 29 is integrally formed. The head portion 38 has a bore 39 therein and has a lug 40 formed thereon which is adapted to engage lugs 41 and 42 formed on the reduced end 36 of the crank shaft 32, so that there is a lost motion connection between the lever 35 and the crank shaft 32 as the lever 35 is rotated.

Mounted on the crank portion 42 of the crank shaft 32 is a pawl 43, the said pawl 43 having a lower end portion 44 adapted to engage the teeth on the pawl wheel 17. The pawl also has a projection 45 at the side thereof which is adapted to be engaged by a projection 46 formed on the crank shaft 32 for purposes which will be hereinafter described. A second laterally extending projection 46a is also provided on the pawl 43 at the upper end thereof and which is adapted to engage against a projection 47 inwardly extending from the front housing 11 when the pawl is in out of engaged position with the pawl wheel 17. Outwardly extending projections 48 and 49 integrally formed with the back plate 10 and outwardly extending therefrom are provided which slidably engage the inner side of the pawl 43, and prevents the pawl 43 from canting inwardly while another projection 50 inwardly extending from the front housing 11 provides a fulcrum member over which the pawl 43 rides at it moves into and out of engagement with the pawl wheel 17.

In operation the device is exceedingly simple in that when the operator seeks to apply the brakes, the lever 35 is turned in a counterclockwise direction (referring to Figures 1, 4, and 7) to the position shown in Figure 1 in which position the projection 46 is in engagement with the projection 45 on the pawl 43, so that by the action of gravity and the weight of the lever 35 the pawl 43 is in engagement with the teeth on the pawl wheel 17 as the lever 35 is being turned in a counterclockwise direction, the cam 29 is rotated, moving the shaft 27 and fork 26 outward which causes the ratchet gear 23 to mesh with the teeth 30, 30 formed on the enlarged portion 29a of the ratchet thimble 17b. The operator now has the brake wheel 18 connected with the gears, and by rotating the hand wheel 18 in a clockwise direction, the brake chain is wound around the drum on the wheel 31 resulting in an application of the brake shoes to the wheels of the car. As the brakes are tightened the pawl 43 and lever 35 oscillate in unit relation as the end 44 of the pawl moves from one tooth on the pawl wheel 17 to another until the operator applies the brakes to the point desired, when the pawl 43 will hold the pawl wheel 17 against reverse rotation retaining the brake shoes in engagement with the wheels of the car.

When it is desired to release the brakes, the lever 35 is moved by the operator in a clockwise direction to a point slightly beyond a vertical position in a path of travel through an arc of approximately 140 degrees, or until the projection 40 engages the projection 41 on the crank shaft 32. The cam 29 on the head 38 of the lever 35 moving through the recess 28a in the shaft 27 and through the fork 26 moves the gear 33 inwardly over the squared portion 22 of the shaft 14 and out of engagement with the ratchet thimble 17b, thereby releasing the brake wheel 18 from the winding mechanism. A continued movement of the release lever 35 in a clockwise direction rotates the crank shaft 32 through the engagement of the lug 40 with the lug 41 on the reduced end 36 of the crank shaft 32, and rotates this crank shaft 32 slightly out of its dead center position when the tension of the chain throws the pawl 43 clear of the pawl wheel 17 and enables the brakes to be released from the car wheels. Normally the force exerted on the pawl wheel 17 by the chain is sufficient to throw the pawl out of engagement with the pawl wheel 17 but if it is not, the operator by further rotating the release lever in a clockwise direction shifts the upper end of the pawl 43 forward and downward, which causes the pawl 43 to ride on the projection 50 and enables the operator to force the pawl out of engagement with the pawl wheel 17. As the pawl 43 is released from the pawl wheel 17, the tension of the chain will cause a backward rotation of the pawl wheel 17 rotating the ratchet gear 23 and the shaft 14 freely in the ratchet thimble 17b while the brake wheel 18 remains stationary and therefore has no back spin. Thereafter, with the brakes in released position, when it is desired to again make an application of the brakes, the release lever 35 is moved in a counterclockwise direction to the position shown in Figure 1 of the drawings, and as the lever is moved in this direction the cam 29 automatically slides the ratchet gear 23 outwardly, so that the teeth 24, 24 are moved into engagement with the teeth 30, 30 on the ratchet thimble 17b fixed in the hub of the brake wheel and the operator by turning the brake wheel in a clockwise direction can again apply the brakes to the car.

It will be understood that the brake wheel 18 and the ratchet thimble 17b may be integrally made if desired, although because of the durability of providing a structure in which standard brake wheel are interchangeable, it is advisable that the ratchet thimble 17b be separate from the hub of the brake wheel so that should it be desired to convert standard brakes to brakes of the present invention there would be no necessity for providing special brake wheels as the ones now standard could be used.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

What is claimed is:

1. A railway car brake comprising in combination a frame, a rotatable brake shaft mounted therein, a brake hand wheel loosely mounted on the said brake shaft having a ratchet connection at one side thereof, a ratchet gear slidably mounted on the said brake shaft having teeth thereon adapted to engage the ratchet connection of the said brake wheel, a fork in engagement with the said ratchet gear, a shaft having a slot therein connected to the said fork, a pawl operating lever, a cam on said pawl operating lever operating in the said slot in the said shaft whereby the said ratchet gear is moved into and out of engagement with the ratchet connection of the brake hand wheel.

2. A railway car brake comprising in combination a frame, a rotatable brake shaft mounted therein having a rectangular portion and a round portion in cross section, a brake wheel rotatably mounted on the round portion of the said brake shaft and having a ratchet connection at one side thereof, a ratchet slidably mounted on the rectangular portion of the said brake shaft and non-rotatable thereon, adapted to cooperate with the ratchet connection on the brake wheel, a fork connected with said ratchet, a shaft having a recess therein connected with the said fork and a pivotally mounted lever having a cam thereon, the said cam extending into the recess on the said shaft whereby upon movement of the lever the slidably mounted ratchet is shifted into and out of engagement with the ratchet connection on the said brake wheel.

3. A railway car brake comprising in combination, a frame, a rotatable brake shaft connected to the winding mechanism of the brake mounted in said frame having a round portion in cross section, a pawl wheel on the said shaft, a pawl shaft mounted on the said frame, a pawl on said shaft mounted for engagement with the pawl wheel, a brake wheel, a ratchet thimble mounted in the brake wheel on the round portion of the said brake shaft and freely rotatable thereon and having a toothed portion, a ratchet gear wheel longitudinally slidably mounted on the said brake shaft and non-rotatable thereon, a fork in engagement with the said ratchet gear wheel, a shaft connected to the said fork having a recess therein and a pawl release lever having a cam thereon extending into the said recess, the pawl release lever having a lost motion connection with the said pawl shaft whereby the brake wheel is disengaged from the winding mechanism before the pawl is released from the pawl wheel.

4. A railway car hand brake mechanism comprising in combination a frame, a winding mechanism, a brake wheel shaft mounted in the said frame having a round portion in cross section near its outer end connected to the winding mechanism, a pawl wheel on the said shaft, a rotatably mounted pawl supporting crank shaft, a pawl on the said shaft in aligned relation with the pawl wheel, a hand brake wheel, a ratchet thimble non-rotatably mounted in the said brake wheel and freely rotatably on the said brake shaft and having a gear portion thereon, a longitudinally movable ratchet gear on the said brake shaft for engagement with the gear portion on the said ratchet thimble and combined means whereby the said movable ratchet gear is disengaged from the gear portion of the ratchet thimble and the pawl is released from the pawl wheel in timed relation with each other.

5. A railway car hand brake mechanism comprising in combination a frame, a chain winding mechanism mounted therein, a brake wheel shaft mounted in the said frame having a round portion in cross section near its outer end, a pawl wheel on the said shaft, a rotatably mounted pawl supporting crank shaft, a pawl on the said shaft in aligned relation with the pawl wheel, a hand brake wheel, a ratchet thimble freely rotatable on the said brake wheel shaft having a ratchet gear portion thereon mounted in said brake wheel, a longitudinally movable ratchet gear on the said brake shaft for engagement with the ratchet portion of the said ratchet thimble in fixed rotative engagement with the said shaft and combined means whereby the said movable gear is disengaged from the gear portion of the ratchet thimble and the pawl is released in timed relation with each other, the disengagement of the movable gear and the ratchet thimble upon which the hand wheel is mounted being accomplished before the pawl is released from the pawl wheel.

6. A railway car hand brake mechanism comprising in combination a frame, a chain winding mechanism mounted therein, a brake wheel shaft mounted in the said frame having a round portion in cross section near its outer end, a pawl wheel on the said shaft, a rotatably mounted pawl supporting crank shaft, a pawl on the said shaft in aligned relation with the pawl wheel, a hand brake wheel, a ratchet thimble freely rotatable on the said brake wheel shaft having a ratchet gear portion thereon mounted in said brake wheel, a longitudinally movable ratchet gear on the said brake shaft for engagement with the ratchet gear portion of the said ratchet thimble in fixed rotative engagement with the said shaft, a fork on said gear wheel, a shaft having a recess therein connected to said fork, and a release lever having a cam thereon operating in the said recess and having a lost motion connection with the said pawl shaft whereby the brake wheel is released from the winding mechanism before the pawl is free of the pawl wheel.

7. A railway car hand brake mechanism comprising in combination a frame, a chain winding mechanism mounted thereon, a brake wheel shaft mounted in the said frame having a round portion in cross section near its outer end, a pawl wheel on the said shaft, a rotatably mounted pawl supporting crank shaft, a pawl on the said shaft in aligned relation with the pawl wheel, a ratchet thimble freely rotatable on the said brake wheel shaft having a ratchet gear portion thereon, a brake wheel in which the ratchet thimble is mounted, a longitudinally movable ratchet gear on the said brake shaft for engagement with the ratchet portion of the said ratchet thimble in fixed rotative engagement with the said shaft, a fork on said gear wheel, a shaft having a recess at one end thereof and connected to the said fork at the other end, and a release lever having a lost motion connection with the said pawl shaft and a cam portion at its base operating in the recess in the said shaft whereby the brake wheel is released prior to the release of the pawl from the pawl wheel.

8. A railway car brake comprising in combination a frame, a chain winding mechanism on said frame, a rotatable brake shaft having a rectangular portion and a round portion adjacent each other, a movable mounted ratchet on the rectangular portion of the said brake shaft, a fork in engagement with the said movable mounted ratchet, a shaft upon which the said fork is mounted having a side recess therein adjacent one side thereof, a combined trip lever and cam rotatably mounted on the said frame, the cam being in engagement with the shaft upon which the said fork is mounted, a ratchet thimble tapered outwardly on its outer periphery in fixed longitudinal position on the said brake shaft but freely rotatable thereon and a brake wheel having a tapered opening therein fitted over the said ratchet thimble and non-rotatable relative thereto.

JOHN P. TEMPLEMAN.

References Cited in the file of this patent

UNITED STATES PATENTS

| Number | Name | Date |
| --- | --- | --- |
| 1,938,885 | Wrigley | Dec. 12, 1933 |
| 2,071,269 | Bartsch | Feb. 16, 1937 |
| 2,112,235 | Camp | Mar. 29, 1938 |
| 2,179,674 | Stolpe | Nov. 14, 1939 |
| 2,272,437 | Smith | Feb. 10, 1942 |
| 2,318,569 | Camp et al. | May 4, 1943 |